(No Model.)
C. H. WATSON.
BICYCLE SEAT SUPPORT.
No. 568,593. Patented Sept. 29, 1896.
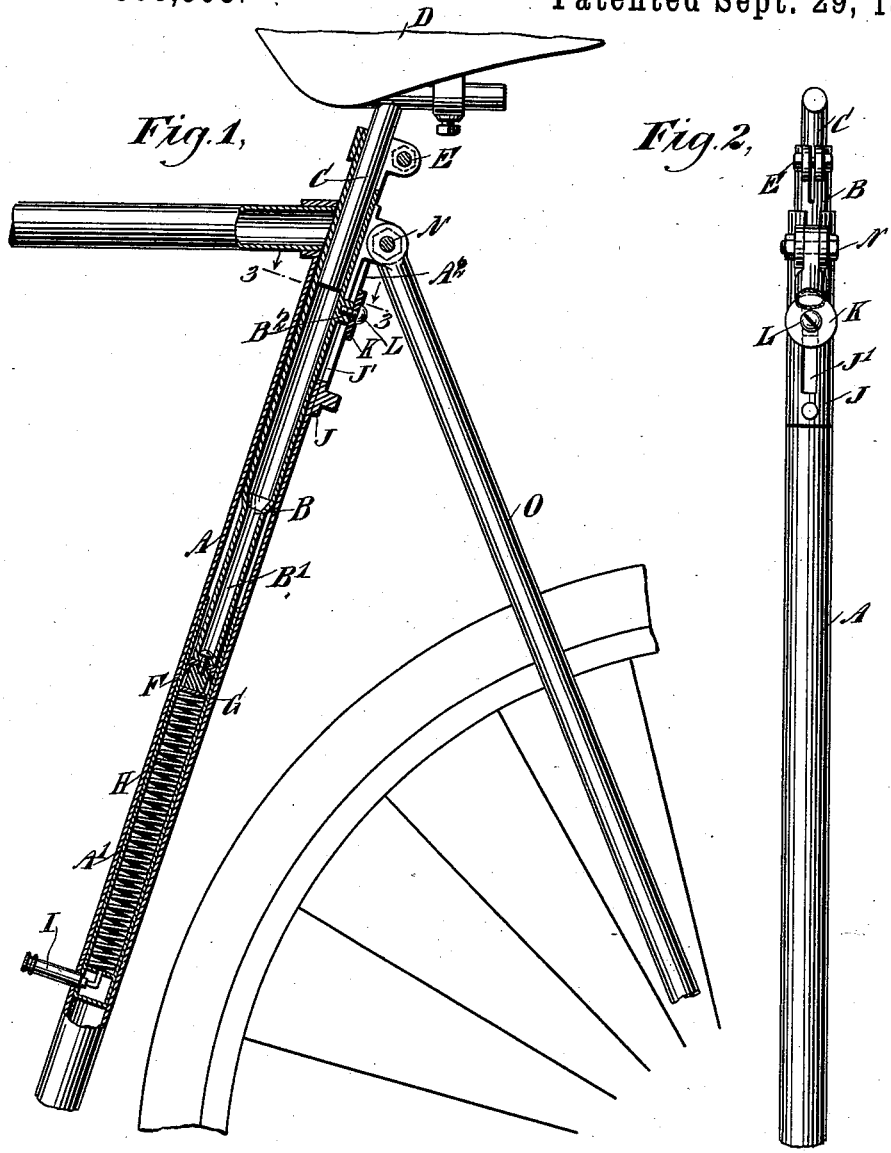
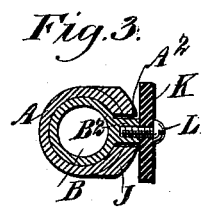
Fig. 3.
WITNESSES:
Edward Thorpe
Theo. G. Hoster
INVENTOR
C. H. Watson
BY Munn & Co
ATTORNEYS.
THE NORRIS PETERS CO., PHOTO-LITHO., WASHINGTON, D. C.

UNITED STATES PATENT OFFICE.

CHRISTOPHER H. WATSON, OF RIVERSIDE, CALIFORNIA.

BICYCLE-SEAT SUPPORT.

SPECIFICATION forming part of Letters Patent No. 568,593, dated September 29, 1896.

Application filed November 30, 1895. Serial No. 570,683. (No model.)

*To all whom it may concern:*

Be it known that I, CHRISTOPHER H. WATSON, of Riverside, in the county of Riverside and State of California, have invented a new and Improved Bicycle-Seat Support, of which the following is a full, clear, and exact description.

The object of the invention is to provide a new and improved bicycle-seat support which is simple and durable in construction, very effective in operation, and arranged to permit of yieldingly supporting the rider, the amount of yielding movement being regulated according to the weight of the rider.

My invention relates to that class of bicycles employing a spring in the center brace, and contemplates the production of a simple and highly efficient device of this character composed of but few parts, which will be hereinafter fully set forth, and particularly pointed out in the claims.

Reference is to be had to the accompanying drawings, forming a part of this specification, in which similar characters of reference indicate corresponding parts in all the figures.

Figure 1 is a sectional side elevation of the improvement. Fig. 2 is an end view of the same, and Fig. 3 is an enlarged sectional plan view of the same on the line 3 3 of Fig. 1.

In the center brace A of the bicycle-frame is fitted to slide a tube B, in the upper end of which is secured a saddle-post C, carrying the saddle D, said post being held in place in the tube B by the usual clamping-bolt E on the upper end of the tube B. The lower reduced and closed end B' of the tube B fits into a tube A' held in the center brace, and on the end B' is arranged a piston F, fitting into the said tube A', and from the piston F extends a keeper G, on which rests the upper end of a spring H, coiled in the tube A', as indicated in Fig. 1. The tube A' in the center brace A is provided at its lower closed end with an air-inlet valve I of any approved construction and adapted to be connected with an air-pump, so that the said tube A' can be filled with compressed air to act on the piston F and support the tube B, saddle-post C, saddle D, and the rider, in addition to the support given by the spring H.

The sliding movement of the tube B is limited by a lug B², extending through a slot A² in the upper end of the center brace A, said lug also extending into a slot J', formed in a reinforcing-strip J, secured to the center brace A, as is plainly shown in Figs. 1 and 2. A washer K is held on the outer end of the lug B² by a set-screw L.

Now it will be seen that the tube A' is filled with compressed air to form an air-cushion for the tube B, saddle-post C, and saddle D, and by increasing or decreasing the pressure of the air in the tube A', I am enabled to readily limit the extent of yielding motion of the tube B in the center brace, according to the weight of the rider. Thus, for a heavy person, more air is pumped into the tube A', and for a lighter person less air is required. In both cases the spring H remains the same, and in case the rider is a heavy person the spring is not subjected to undue strain and injured, as is so frequently the case in similar supports.

The piston F is made of leather or other suitable material and cup-shaped, so as to readily fit against the interior of the tube A' to prevent leakage and to produce the proper cushion effect. When it is desired to have a rigid saddle-support, then the tube B is rigidly secured in the center brace A by a clamping-screw N, carrying the rear fork O, as shown in Fig. 1.

Having thus described my invention, I claim as new and desire to secure by Letters Patent—

1. A bicycle-seat support, comprising a saddle-tube fitting in the center brace of the bicycle in the upper end of which the saddle-post is secured, said tube having a lower reduced portion, a spring-tube rigidly secured in the lower portion of said center brace, its upper open end surrounding said reduced portion of said saddle-tube, a piston secured to said reduced portion and arranged to move in said spring-tube, an air-inlet valve, whereby air may be compressed in said spring-tube to support said piston and said saddle-tube, and a spring in said spring-tube having its upper end secured to a keeper extending from said piston, its lower end resting on the bottom of said tube, as and for the purpose specified.

2. The combination with a bicycle-seat support, comprising a saddle-tube fitting in the center brace of the bicycle and a saddle-post located therein, said tube being provided with a lower reduced and closed end, of a cup-shaped piston on said reduced end from which extends a keeper, an air-tube having its open upper end surrounding said reduced portion of said saddle-tube, a coil-spring located in said air-tube, its upper end resting on said keeper, an air-inlet valve in said air-tube, whereby compressed air may be introduced therein and support said saddle-tube, a lug on said saddle-tube extending through a slot in said center brace and limiting the movement of said tube, and a clamping device for rigidly securing said tube in said center brace, as and for the purpose described.

CHRISTOPHER H. WATSON.

Witnesses:
M. C. PAXTON,
WM. A. CORRELL.